(12) United States Patent
Guo et al.

(10) Patent No.: US 10,168,610 B2
(45) Date of Patent: Jan. 1, 2019

(54) PROJECTION SYSTEM

(71) Applicant: Appotronics Corporation Limited, Shenzhen (CN)

(72) Inventors: Zuqiang Guo, Shenzhen (CN); Zeqin Wang, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 15/532,461

(22) PCT Filed: Dec. 2, 2015

(86) PCT No.: PCT/CN2015/096214
§ 371 (c)(1),
(2) Date: Jun. 1, 2017

(87) PCT Pub. No.: WO2016/091106
PCT Pub. Date: Jun. 16, 2016

(65) Prior Publication Data
US 2017/0329214 A1   Nov. 16, 2017

(30) Foreign Application Priority Data
Dec. 8, 2014 (CN) .......................... 2014 1 0743534

(51) Int. Cl.
*G03B 21/20* (2006.01)
*H04N 9/31* (2006.01)
(Continued)

(52) U.S. Cl.
CPC ........... *G03B 33/12* (2013.01); *G03B 21/005* (2013.01); *G03B 21/204* (2013.01);
(Continued)

(58) Field of Classification Search
CPC .............. G03B 21/204; G03B 21/2013; G03B 21/2033; H04N 9/3158; H04N 9/3161; H04N 9/3164
See application file for complete search history.

(56) References Cited

U.S. PATENT DOCUMENTS

2005/0259225 A1   11/2005   Greenberg et al.
2014/0347634 A1*  11/2014   Bommerbach ...... H04N 9/3158
                                              353/31

FOREIGN PATENT DOCUMENTS

CN      102520571 A     6/2012
CN      103033918 A     4/2013
(Continued)

OTHER PUBLICATIONS

Hu et al.; CN 103713455 A, Apr. 9, 2014; Machine translation in English.*

(Continued)

*Primary Examiner* — Ryan Howard
(74) *Attorney, Agent, or Firm* — Seed Intellectual Property Law Group LLP

(57) ABSTRACT

A projection system includes a light source system for generating a first light beam in a first timing sequence and for generating a second light beam in a second timing sequence, the first light beam comprising a first light and a first compensation light, and the second light beam comprising a second light or comprising the second light and a first compensation light. A light splitting device sequentially divides the first light beam and the second light beam into a light transmitting along a first light path and a light transmitting along a second light path. A first light modulating device modulates the light travelling along the first light path, and a second light modulating device modulates the light travelling along the second light path. The first light or (Continued)

the second light is compensated by the first compensation light to have a wider color gamut of a synthesized color image.

19 Claims, 8 Drawing Sheets

(51) Int. Cl.
    *G03B 33/12*     (2006.01)
    *G03B 21/00*     (2006.01)

(52) U.S. Cl.
    CPC ..... *G03B 21/2013* (2013.01); *G03B 21/2053* (2013.01); *H04N 9/3155* (2013.01); *H04N 9/3158* (2013.01); *H04N 9/3161* (2013.01); *H04N 9/3164* (2013.01)

(56) References Cited

FOREIGN PATENT DOCUMENTS

| | | |
|---|---|---|
| CN | 103576435 A | 2/2014 |
| CN | 103713455 A | 4/2014 |
| CN | 104216210 A | 12/2014 |
| CN | 204302654 U | 4/2015 |
| CN | 105022212 A | 11/2015 |

OTHER PUBLICATIONS

International Search Report, dated Mar. 10, 2016, for International Application No. PCT/CN2015/096214, 3 pages.

\* cited by examiner

PROJECTION SYSTEM

BACKGROUND

Technical Field

The present disclosure relates to the field of optical technologies, and in particular, to a projection system.

Description of the Related Art

At present, digital light processing (DLP) projection technology based on a digital micromirror device (DMD) has been more and more widely used. The most widely used DLP projection systems are single-chip DMD projection systems and three-chip DMD projection systems.

As shown in FIG. 1, a single-chip DMD projection system includes a light source 100, a collecting lens 101, a rotating color wheel 102, a square rod 103, a light relay system 104, a DMD chip 105, a TIR prism 106, and a projection lens 107, where the light source 100 is a semiconductor laser or a light emitting diode. Excitation light emitted by the light source 100 passes through the collecting lens 101 and then is focused onto the rotating color wheel 102. The rotating color wheel 102 has three kinds of fluorescent powder of red R, green G, and blue B and different kinds of fluorescent powders are located in different areas of the rotating color wheel 102 as shown in FIG. 2. Light of three primary colors of red R, green G, and blue B having a time sequence can be generated after the excitation light is incident on different areas of the rotating color wheel 102. The light of the three primary colors sequentially passes through the square rod 103 and the light relay system 104, and then is incident on the TIR prism 106 and reflected by the TIR prism 106 to the DMD chip 105 for modulation, by which an image is formed and then outputted from the projection lens 107.

In the aforementioned single-chip DMD projection system, the light of the three primary colors of red R, green G, and blue B is sequentially incident on the DMD 105 in a time sequence for modulation, and then monochrome images obtained after modulation are synthesized into a color image through an integral effect of human eyes. However, in a three-chip DMD projection system, each DMD modulates one kind of primary light, for example, the first DMD modulates red light R, the second DMD modulates green light G, and the third DMD modulates blue light B, and then monochrome images obtained after modulation by the three DMDs are spatially superimposed for synthesizing a color image. That is to say, in existing DLP projection systems, regardless of single-chip DMD projection systems or three-chip DMD projection systems, color images are synthesized based on the principle of three primary colors.

Although the color gamut of the aforementioned color image basically meets the REC.709 standard, and the color gamut of the color image LP covers a large part of the REC.709 color gamut as shown in FIG. 3, the color gamut does not completely cover the REC.709 color gamut, that is, some of the existing DLP projection systems still fail to meet the REC.709 standard, let alone the DCI standard.

BRIEF SUMMARY

Accordingly, the present disclosure provides a projection system that solves problems in the prior art in which a color image synthesized in a DLP projection system has a narrow color gamut and cannot meet the REC.709 standard and the DCI standard.

In various embodiments, the present disclosure provides a projection system that includes:

a light source system for generating a first light beam in a first time sequence and generating a second light beam in a second time sequence, where the first light beam includes a first light and a first compensation light, and the second light beam includes a second light, or the second light beam includes a second light and the first compensation light;

a light splitting device for sequentially splitting the first light beam and the second light beam into light travelling along a first light path and light travelling along a second light path;

a first light modulation device for modulating the light travelling along the first light path; and a second light modulation device for modulating the light travelling along the second light path.

Preferably, the first light is a primary light, the second light is a wide-spectrum light including at least two kinds of primary light, and a combined light of the first light and the second light includes light of three primary colors.

Preferably, a spectrum range of the first compensation light is between a spectrum range of the first light and a spectrum range of the second light, and the spectrum range of the first compensation light partially overlaps the spectrum range of the second light.

Preferably, the light splitting device includes a first prism and a second prism, and a light splitting film is disposed at an interface between the first prism and the second prism.

Preferably, in some embodiments, the light source system includes:

a first light source for emitting the first light;

a second light source for emitting the first compensation light; and a rotating color wheel, where the rotating color wheel includes at least one fluorescent color band and one transparent color band, and the fluorescent color band is configured to absorb the first light and generate the second light.

Preferably, the light source system further includes:

a first control device, where the first control device controls the second light source to be turned on in the first time sequence and turned off in the second time sequence so that the second light beam includes the second light.

Preferably, in the first time sequence, the first light and the first compensation light simultaneously transmit the transparent color band to form the first light beam.

Preferably, in some embodiments, the light source system includes:

a first light source for emitting the first light;

a second light source for emitting the first compensation light;

a first rotating color wheel disposed on a light path of the first light, where the first rotating color wheel includes at least one fluorescent color band and one transparent color band, and the fluorescent color band is configured to absorb the first light and generate the second light; and a second rotating color wheel disposed on a light path of the second light, where the second rotating color wheel is a transparent color wheel.

Preferably, the light source system further includes:

a second control device, where the second control device controls the second light source to be turned on in both the first time sequence and the second time sequence so that the second light beam includes the second light and the first compensation light; or the second control device controls the second light source to be turned on in the first time sequence and turned off in the second time sequence so that the second light beam includes the second light.

Preferably, in some embodiments, the light source system includes:

a first light source for emitting the first light; and a first rotating color wheel, where the first rotating color wheel includes at least a first fluorescent color band and a second fluorescent color band, the first fluorescent color band is configured to absorb the first light and generate the second light, and the second fluorescent color band is configured to absorb the first light and generate the first compensation light.

Preferably, when the first compensation light is a narrow-spectrum light, the first light in the first light beam travels along the first light path, and the first compensation light in the first light beam travels along the second light path; and when the first compensation light is a wide-spectrum light, the light splitting device splits the first compensation light in the first light beam into a first part of the first compensation light and a second part of the first compensation light, and the first part of the first compensation light and the first light in the first light beam simultaneously travel along the first light path, and the second part of the first compensation light travels along the second light path.

Preferably, the light splitting device splits the second light in the second light beam into a third light and a fourth light, and the third light travels along the first light path, and the fourth light travels along the second light path; and when the second light beam includes the first compensation light, the first compensation light and the fourth light simultaneously travel along the second light path.

Preferably, the light source system further includes:

a third light source for emitting a second compensation light, where the second compensation light and the third light are light of the same color and different spectra, and the second compensation light and the third light simultaneously travel along the first light path.

Preferably, the light source system further includes:

a third control device, where the third control device controls the third light source to be turned off in the first time sequence and turned on in the second time sequence so that the second compensation light and the third light are simultaneously generated.

Preferably, the first light is blue light, the third light is red light, and the fourth light is green light; the first compensation light is cyan light or green light or cyan-green light; and the second compensation light is red light.

Preferably, a wavelength range of the first compensation light is 510 nm to 530 nm; and a wavelength range of the second compensation light is 625 nm to 645 nm.

By way of the projection system provided in the present disclosure, a light source system generates a first light beam in a first time sequence and generates a second light beam in a second time sequence, the first light beam includes a first light and a first compensation light, and the second light beam includes a second light or includes a second light and the first compensation light; a light splitting device sequentially splits the first light beam and the second light beam into light travelling along a first light path and light travelling along a second light path, so that the first light or the second light can be compensated by the first compensation light to expand the spectrum range of the first light or the second light, which makes a synthesized color image have a wider color gamut and meet REC.709 and DCI color gamut standards.

Moreover, the projection system provided in the present disclosure uses two light modulation devices to respectively modulate the light travelling along the first light path and the light travelling along the second light path, and thus has higher luminous efficiency and brightness than a system using a single light modulation device and has simpler structure and lower costs than a system using three light modulation devices.

BRIEF DESCRIPTION OF THE SEVERAL VIEWS OF THE DRAWINGS

To illustrate various embodiments of the present disclosure more clearly, the drawings to be used in the description of the embodiments will be introduced briefly as follows. It is apparent that the drawings in the following description are only illustrative embodiments of the present disclosure. For those skilled in the art, drawings of additional embodiments can be obtained according to the provided drawings without any creative work.

DETAILED DESCRIPTION

Embodiments of the present disclosure will be described clearly and completely as follows in conjunction with the drawings. It is apparent that the described embodiments are only some, rather than all of the embodiments of the present disclosure. Additional embodiments obtained by those skilled in the art based on the embodiments in the present disclosure without any creative work fall in the scope of the present disclosure.

Embodiment 1

This embodiment provides a projection system, which includes a light source system, a light splitting device, a first light modulation device, and a second light modulation device. The light source system generates a first light beam in a first time sequence and generates a second light beam in a second time sequence. The light splitting device sequentially splits the first light beam and the second light beam into light travelling along a first light path and light travelling along a second light path. The first light modulation device modulates the light travelling along the first light path, and the second light modulation device modulates the light travelling along the second light path.

The first light modulation device and the second light modulation device in this embodiment include, but are not limited to, a digital micromirror device (DMD), a liquid crystal on silicon (LCOS), and a liquid crystal display (LCD). For ease of description, the light modulation devices in this embodiment and subsequent embodiments are mainly described in the manner of DMD modulation.

In this embodiment, preferably, a first light is a primary light, a second light is a wide-spectrum light including at least two kinds of primary light, and a combined light of the first light and the second light includes light of three primary colors. Further, a spectrum range of a first compensation light is between a spectrum range of the first light and a spectrum range of the second light, and the spectrum range of the first compensation light partially overlaps the spectrum range of the second light.

For example, the first light is blue light, the second light is yellow light including red light and green light, and the first compensation light is cyan light. A spectrum range of the cyan light is between spectrum ranges of the blue light and the yellow light, and the spectrum range of the cyan light partially overlaps the spectrum range of the yellow light, so that the cyan light not only can compensate a color gamut of the blue light but also can compensate a color gamut of the green light split from the yellow light.

Figure 1:
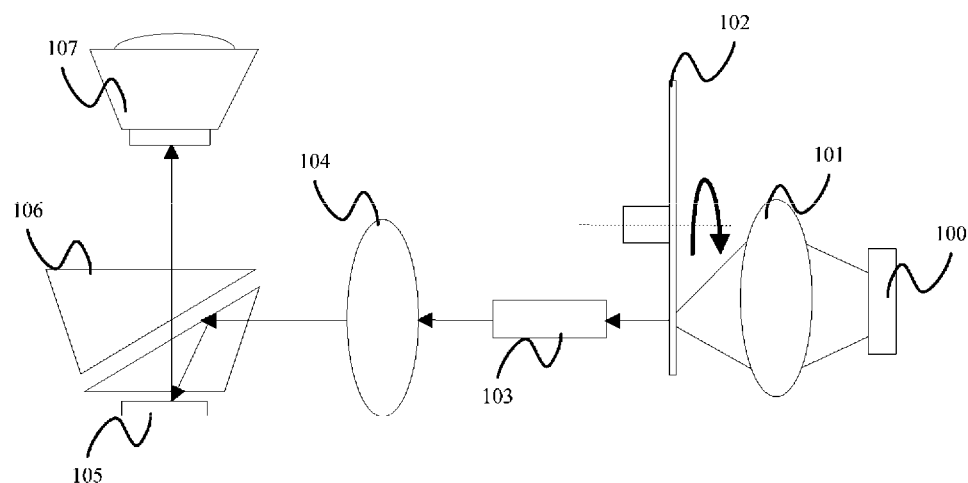
FIG. 1 is a schematic structural view of an existing single-chip DMD projection system.
Figure 2:
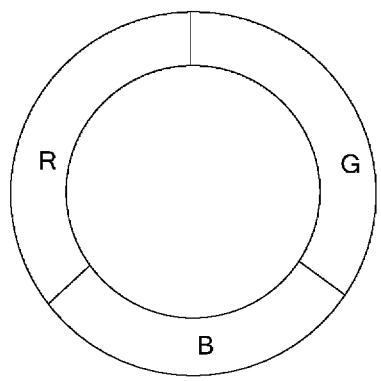
FIG. 2 is a structural view illustrating areas of a rotating color wheel in the existing projection system.
Figure 3:
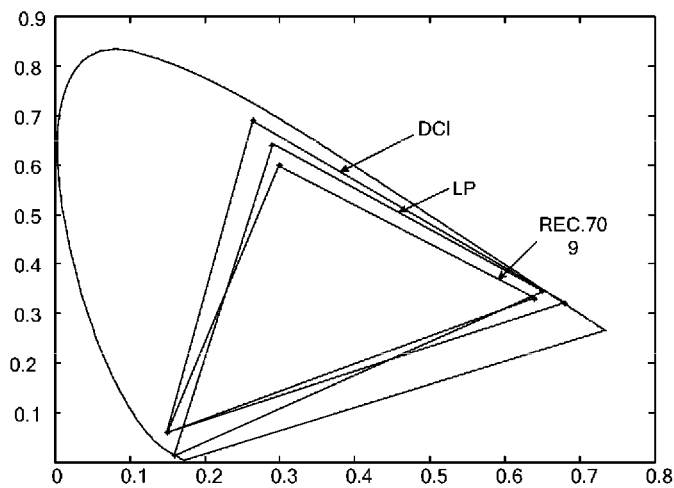
FIG. 3 is a diagram illustrating a color gamut of a color image formed in the existing projection system.
Figure 4:
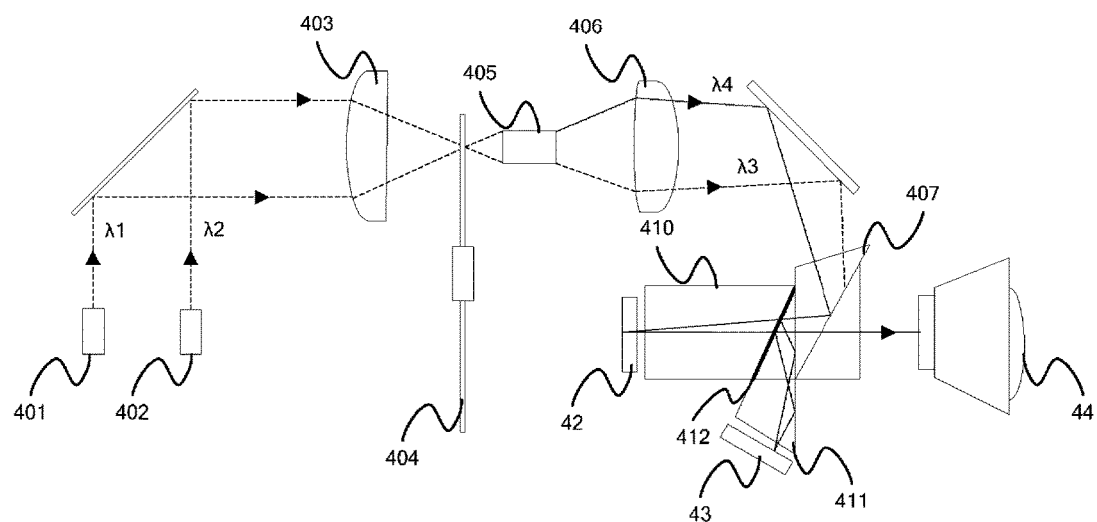
FIG. 4 is a schematic structural view of a projection system provided in Embodiment 1 of the present disclosure.

In this embodiment, as shown in FIG. 4, the light source system includes a first light source 401 for emitting first light $\lambda 1$, a second light source 402 for emitting first compensation light $\lambda 2$, a light relay system 403, and a rotating color wheel 404. The first light source 401 is a laser light source for emitting blue light, and a wavelength of the blue light emitted by the first light source 401 is preferably 445 nm. The second light source 402 is a laser light source for emitting cyan light, and the cyan light emitted by the second light source 402 is light having a narrow spectrum and has a wavelength of preferably 510 nm.

Certainly, in other embodiments, the first light source 401 and the second light source 402 may also be light emitting diodes, or the second light source 402 may also be a light source for emitting cyan-green light having a waveband of 490 nm to 530 nm, or may be a light source for emitting green light. The present disclosure is not limited thereto, as long as a color gamut of a synthesized color image can be expanded.

Figure 5:
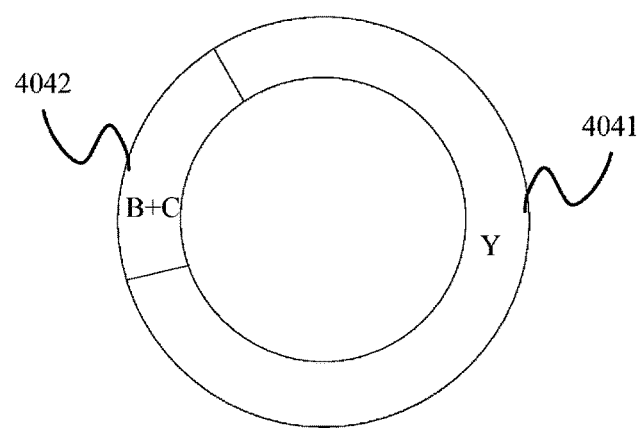
FIG. 5 is a structural view illustrating areas of a rotating color wheel provided in Embodiment 1 of the present disclosure.

In this embodiment, as shown in FIG. 5, the rotating color wheel 404 includes a fluorescent color band 4041 and a transparent color band 4042, where the fluorescent color band 4041 has yellow fluorescent powder, the transparent color band 4042 has scattering powder, and the scattering powder is configured to depolarize the blue light and the cyan light and then output them. Moreover, the rotating color wheel 404 has a driving device, for example, a motor, for driving the rotating color wheel 404 to rotate, so that the fluorescent color band 4041 and the transparent color band 4042 sequentially rotate to a light path of the first light $\lambda 1$ or sequentially rotate to a light path of the first compensation light $\lambda 2$, where the transparent color band 4042 can be simultaneously disposed on the light paths of the first light $\lambda 1$ and the first compensation light $\lambda 2$ to form a first light beam $\lambda 4$ including the first light $\lambda 1$ and the first compensation light $\lambda 2$.

In this embodiment, in the first time sequence, the transparent color band 4042 rotates to the light paths of the first light $\lambda 1$ and the first compensation light $\lambda 2$. The first light $\lambda 1$ and the first compensation light $\lambda 2$, namely, blue light and cyan light, simultaneously transmit the transparent color band 4042 and then form the first light beam $\lambda 4$. In the second time sequence, the fluorescent color band 4041 rotates to the light path of the first light $\lambda 1$, and the fluorescent color band 4041 absorbs the first light $\lambda 1$ and generates a second light, namely, a second light beam $\lambda 3$, that is, absorbs the blue light and generates a yellow light Y.

Afterwards, the first light beam $\lambda 4$ or the second light beam $\lambda 3$ passes through a square rod 405, a light relay system 406, and a total internal reflection (TIR) prism 407, and enters the light splitting device. In this embodiment, the light splitting device includes a first prism 410, a second prism 411, and a light splitting film 412 disposed at an interface between the first prism 410 and the second prism 411. The light splitting film 412 is a semi-transparent and semi-reflective film, and preferably has green light bandpass characteristics.

Figure 6:
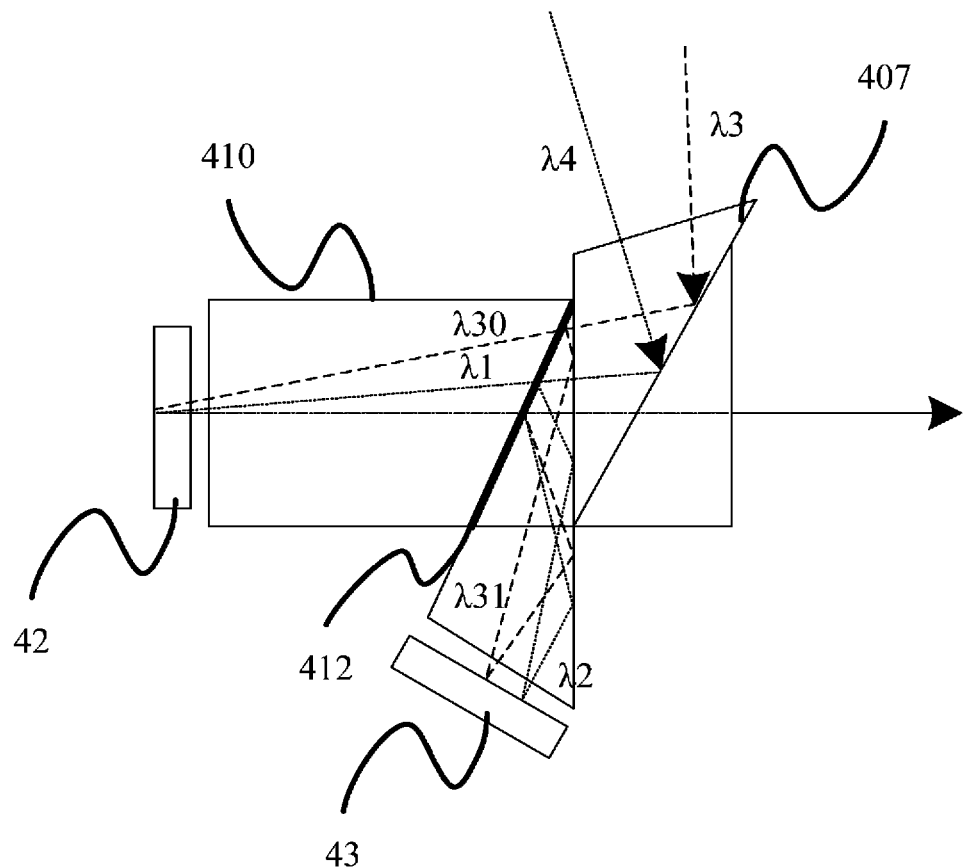
FIG. 6 is a schematic structural view of a light splitting device provided in Embodiment 1 of the present disclosure.

Specifically, as shown in FIG. 6, the light splitting device splits the first light beam $\lambda 4$ into the first light $\lambda 1$ travelling along the first light path and the first compensation light $\lambda 2$ travelling along the second light path in the first time sequence, that is, splits the first light beam $\lambda 4$ into a blue light B and a cyan light C, and the blue light B is transmitted to the first light modulation device 42 along the first light path, and the cyan light C is transmitted to the second light modulation device 43 along the second light path. The light splitting device splits the second light beam $\lambda 3$ into a third light $\lambda 30$ travelling along the first light path and a fourth light $\lambda 31$ travelling along the second light path in the second time sequence, that is, splits the yellow light Y into a red light R and a green light G, and the red light R is transmitted to the first light modulation device 42 along the first light path, and the green light G is transmitted to the second light modulation device 43 along the second light path.

Figure 7:
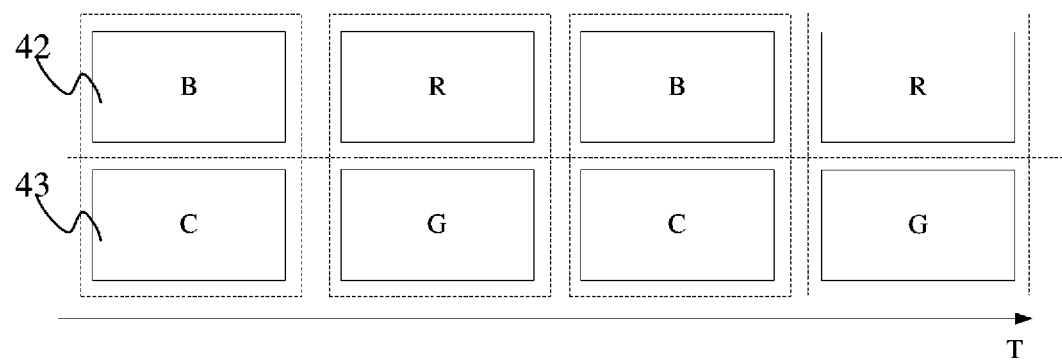
FIG. 7 is a modulation sequence diagram of a first light modulation device and a second light modulation device in Embodiment 1 of the present disclosure.

The first light modulation device 42 sequentially modulates the first light $\lambda 1$ and the third light $\lambda 30$, namely, the blue light B and the red light R, the second light modulation device 43 sequentially modulates the first compensation light $\lambda 2$ and the fourth light $\lambda 31$, namely, the cyan light C and the green light G, and the modulated red light R, green light G, blue light B, and cyan light C are projected through a projection lens 44. A modulation sequence diagram of the first light modulation device 42 and the second light modulation device 43 is shown in FIG. 7.

In this embodiment, the first light source 401 is always in an on state, while the second light source 402 is in an on state only when the transparent color band 4042 rotates to the light path of the first compensation light $\lambda 2$. That is, the light source system in this embodiment further includes a first control device for controlling the second light source 402 to be turned on in the first time sequence and turned off in the second time sequence, that is, controlling the second light source 402 to be turned off when the fluorescent color band 4041 rotates to the light path of the first compensation light $\lambda 2$ and turned on when the transparent color band 4042 rotates to the light path of the first compensation light $\lambda 2$.

Figure 8:
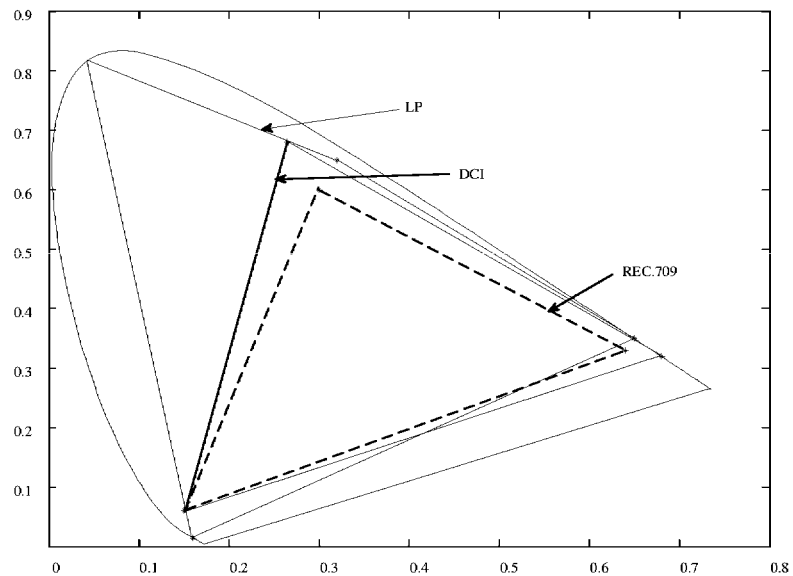
FIG. 8 is a diagram illustrating a color gamut of a projection system provided in Embodiment 1 of the present disclosure.

Since a color image is synthesized using light of the three primary colors of red, green, and blue and compensation light in this embodiment, as compared with the existing manner of synthesizing a color image based on the principle of three primary colors, a color gamut of a color image LP formed in the projection system provided in this embodiment is wider and can cover the REC.709 standard and the DCI standard as shown in FIG. 8.

Figure 9:
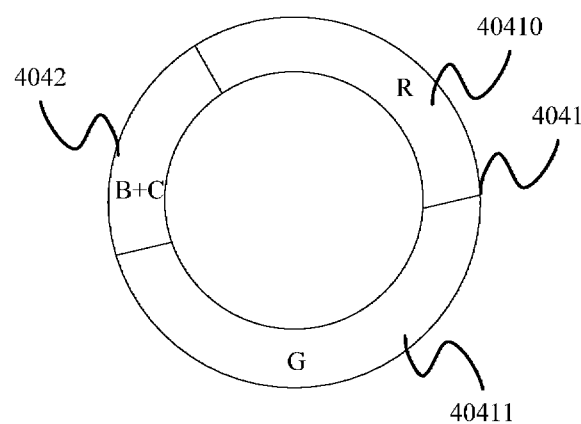
FIG. 9 is another structural view illustrating areas of the rotating color wheel provided in Embodiment 1 of the present disclosure.

In other embodiments of the present disclosure, the fluorescent color band 4041 of the rotating color wheel 404 may also be an area having red fluorescent powder and green fluorescent powder. As shown in FIG. 9, the fluorescent color band 4041 includes a red fluorescent powder color band 40410 and a green fluorescent powder color band 40411. In this regard, the second light is a mixed light of the third light and the fourth light, namely, a mixed light of the red light R and the green light G. The red light R and the green light G may have a time sequence or may be simultaneously generated.

When the red light R and the green light G have a time sequence, the red fluorescent powder color band 40410 and the green fluorescent powder color band 40411 sequentially absorb the first light emitted by the same first light source. The red fluorescent powder color band 40410 is disposed on the light path of the first light source in a first time period of the first time sequence, absorbs the first light and generates the red light R. The green fluorescent powder color band 40411 is disposed on the light path of the first light source in a second time period of the first time sequence, absorbs the first light and generates the green light G. Alternatively, the green fluorescent powder color band 40411 generates the green light G in the first time period of the first time sequence, and the red fluorescent powder color band 40410 generates the red light R in the second time period of the first time sequence. The subsequent light splitting device also transmits the red light R to the first light modulation device and transmits the green light G to the second light modulation device according to a time sequence, and the first light modulation device and the second light modulation device also modulate the red light R and the green light G according to a time sequence.

When the red light R and the green light G are simultaneously generated, the red fluorescent powder color band 40410 and the green fluorescent powder color band 40411 simultaneously absorb the first light emitted by different first light sources. When the red fluorescent powder color band 40410 is disposed on the light path of the corresponding first light source and the green fluorescent powder color band 40411 is also disposed on the light path of the corresponding first light source, the red fluorescent powder color band 40410 and the green fluorescent powder color band 40411 can simultaneously absorb the first light and simultaneously generate the red light R and the green light G in the first time sequence. The subsequent light splitting device also simultaneously transmits the red light R and the green light G to the first light modulation device and the second light modulation device respectively, and the first light modulation device and the second light modulation device also modulate the red light R and the green light G in the same time period. Such a projection system has high luminous efficiency.

Figure 10:
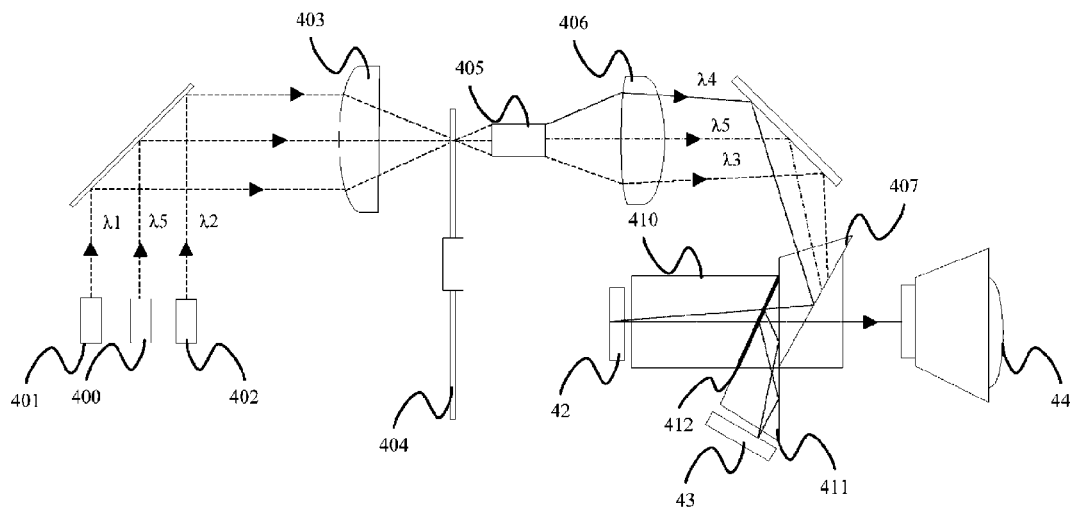
FIG. 10 is a schematic structural view of another projection system provided in Embodiment 1 of the present disclosure.

Additionally, in other embodiments of the present disclosure, the aforementioned light source system further includes a third light source 400. As shown in FIG. 10, the third light source 400 is configured to emit second compensation light $\lambda 5$. The emitted second compensation light $\lambda 5$ is incident on the fluorescent color band 4041. Preferably, the third light source 400 is a laser for emitting red light, and a wavelength range of the red laser, namely, the second compensation light, is 625 nm to 645 nm. Since the fluorescent color band 4041 is an area having yellow fluorescent powder or having red fluorescent powder and green fluorescent powder, the fluorescent color band 4041 can transmit the second compensation light $\lambda 5$, and the fluorescent powder on the fluorescent color band 4041 can convert red light in a polarized state into red light R1 in a non-polarized state.

The second compensation light $\lambda 5$ and the third light $\lambda 40$ are light of the same color and different spectra, that is, the red light R1 and the red light R are light of the same color and different spectra so as to compensate the red light R by the red light R1. Based on this, the second compensation light $\lambda 5$ and the third light $\lambda 40$ simultaneously travel along the first path, and the first light modulation device 42 simultaneously modulates the second compensation light $\lambda 5$ and the third light $\lambda 40$.

In this embodiment, the third light source 400 may always be in an on state, or in order to save energy, may be in an on state only when the fluorescent color band 4041 rotates to the light path of the first light. The aforementioned light source system further includes a third control device for controlling the third light source 400 to be turned off in the first time sequence and turned on in the second time sequence, that is, controlling the third light source 400 to be turned on when the fluorescent color band 4041 rotates to the light path of the first light $\lambda 1$ and turned off when the transparent color band 4042 rotates to the light path of the first light $\lambda 1$. Preferably, the third control device is further used for controlling the second compensation light $\lambda 5$ and the third light $\lambda 40$ to be simultaneously generated.

Figure 11:
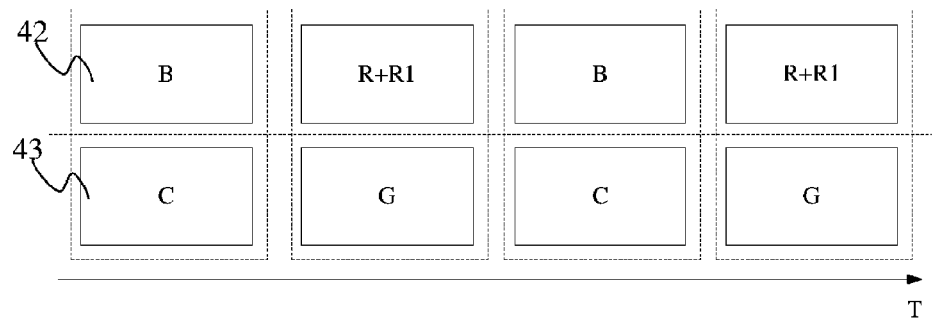
FIG. 11 is another modulation sequence diagram of the first light modulation device and the second light modulation device in Embodiment 1 of the present disclosure.

As shown in FIG. 10, in the first time sequence, the light splitting device splits the first light beam $\lambda 4$ into the first light $\lambda 1$ and the first compensation light $\lambda 2$, and transmits the first light $\lambda 1$, namely, the blue light B, to the first light modulation device 42 and transmits the first compensation light $\lambda 2$, namely, the cyan light C, to the second light modulation device 43. In the second time sequence, the second compensation light $\lambda 5$ and the second light beam $\lambda 3$ simultaneously arrive at the light splitting device, and the light splitting film 412 splits the second light beam $\lambda 3$ into the red light R and the green light G. The second compensation light $\lambda 5$, namely, the red light R1 and the red light R are superimposed and then enter the first light modulation device 42, and the green light G enters the second light modulation device 43. A modulation sequence diagram of the first light modulation device 42 and the second light modulation device 43 is shown in FIG. 11.

Figure 12:
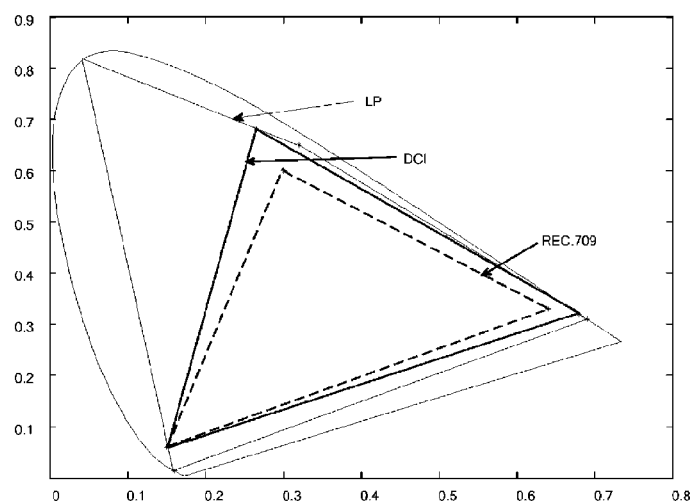
FIG. 12 is a diagram illustrating a color gamut of another projection system provided in Embodiment 1 of the present disclosure.

Since red light for forming a color image not only includes the red light R generated by the rotating color wheel but also includes the red laser R1 generated by the third light source 400, the projection system provided in this embodiment can have expanded color coordinates of the primary color red light and an increased proportion of the red light, and the expanded quadrilateral color gamut thereof is shown in FIG. 12. As compared with Embodiment 1 and Embodiment 2, a color gamut of a color image LP formed in the projection system provided in this embodiment is wider and can better meet REC.709 and DCI color gamut standards.

By way of the projection system provided in this embodiment, a light source system generates a first light beam in a first time sequence and generates a second light beam in a second time sequence. The first light beam includes a first light and a first compensation light, and the second light beam includes a second light. A light splitting device sequentially splits the first light beam and the second light beam into light travelling along a first light path and light travelling along a second light path, so that the first light, namely, blue light, can be compensated by the first compensation light, namely, a cyan light, to expand the spectrum range of the blue light and have a wider color gamut of a synthesized color image, thereby better meeting REC.709 and DCI color gamut standards.

Moreover, the projection system provided in this embodiment uses two light modulation devices to respectively modulate the light travelling along the first light path and the light travelling along the second light path. The projection system in this embodiment thus has higher luminous efficiency and brightness than a system using a single light modulation device and has simpler structure and lower costs than a system using three light modulation devices.

Embodiment 2

This embodiment provides a projection system. The projection system provided in this embodiment and the projection system provided in Embodiment 1 have substantially the same structure and both include a light source system, a light splitting device, a first light modulation device, and a second light modulation device. Moreover, the light source system in this embodiment also includes a first light source 401 for emitting a first light $\lambda 1$ and a second light source 402 for emitting a first compensation light $\lambda 2$, and the first light source 401 is a laser light source for emitting a blue light, and the second light source 402 is a laser light source for emitting a cyan light, and similarly, the first compensation light in this embodiment is a cyan light having a narrow spectrum.

Figure 13:
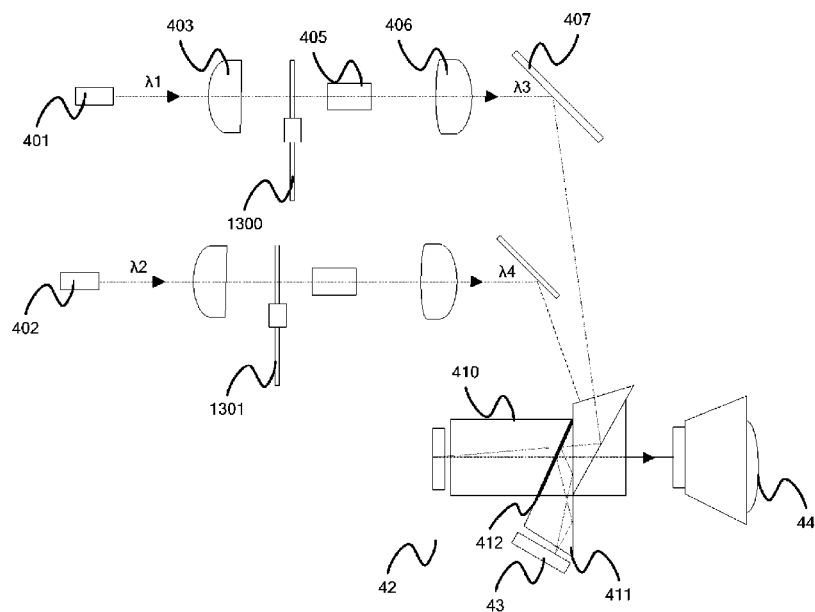
FIG. 13 is a schematic structural view of a projection system provided in Embodiment 2 of the present disclosure.

The difference between the projection system provided in this embodiment and the projection system provided in Embodiment 1 lies in that the light source system in this embodiment includes a first rotating color wheel 1300 disposed on a light path of the first light $\lambda 1$ and a second rotating color wheel 1301 disposed on a light path of the first compensation light $\lambda 2$. As shown in FIG. 13, the first rotating color wheel 1300 includes at least one fluorescent color band and one transparent color band. The fluorescent color band and the transparent color band sequentially rotate to the light path of the first light $\lambda 1$. The distribution of the fluorescent color band and the transparent color band is the same as the distribution of the fluorescent color band 4041 and the transparent color band 4042 in FIG. 5, therefore it will not be described herein again.

The fluorescent color band on the first rotating color wheel 1300 absorbs the first light $\lambda 1$ and generates a second light, that is, absorbs blue laser and generates a yellow light Y. The transparent color band transmits the first light $\lambda 1$, namely, the blue light, and the transparent color band has scattering powder for converting a blue light in a polarized state into a blue light B in a non-polarized state. In this embodiment, the fluorescent color band may be an area having yellow fluorescent powder, for example, the fluorescent color band 4041 in FIG. 4, or may be an area having red fluorescent powder and green fluorescent powder, for example, the red fluorescent powder color band 40410 and the green fluorescent powder color band 40411 in FIG. 9, and the principle thereof is also the same as that in the aforementioned embodiment, and therefore will not be described herein again.

The second rotating color wheel 1301 is disposed on the light path of the first compensation light $\lambda 2$, and is configured to transmit the first compensation light $\lambda 2$, namely, cyan light C. The second rotating color wheel 1301 in this embodiment is a scattering wheel, and the scattering powder on the scattering wheel can convert a cyan light in a polarized state into a cyan light C in a non-polarized state, where a first light beam $\lambda 4$ is a mixed light beam of the blue light B and the cyan light C.

Figure 14:
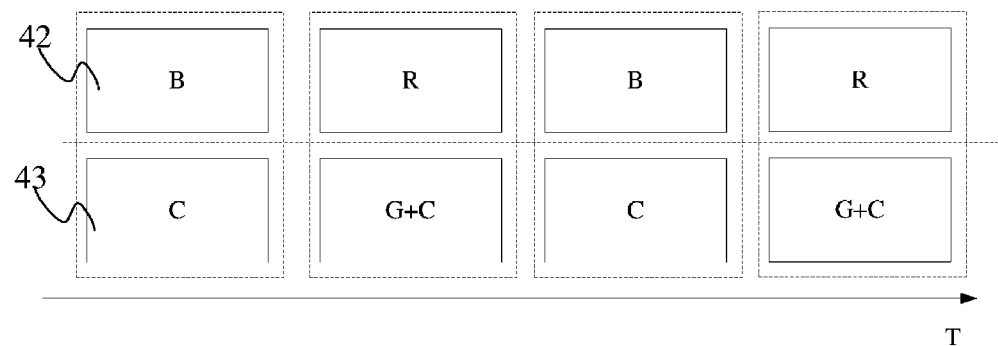
FIG. 14 is a modulation sequence diagram of a first light modulation device and a second light modulation device in Embodiment 2 of the present disclosure.

In this embodiment, the second control device controls the second light source 402 to be in an on state in both the first time sequence and the second time sequence. That is, the second control device controls the second light source 402 to be in an on state both when the fluorescent color band rotates to the light path of the first light $\lambda 1$ and when the transparent color band rotates to the light path of the first compensation light $\lambda 2$, so that a second light beam $\lambda 3$ includes the second light and the first compensation light, namely, the yellow light Y and the cyan light C. In this case, the second light modulation device 43 simultaneously modulates green light G split from the yellow light Y and the cyan light C. A modulation sequence diagram of the first light modulation device 42 and the second light modulation device 43 is shown in FIG. 14.

In other embodiments, the second light source 402 may be in the on state only when the transparent color band rotates to the light path of the first light $\lambda 1$ in order to save energy. In this regard, the second control device controls the second light source 402 to be turned on in a first time sequence and turned off in a second time sequence, that is, turned off when the fluorescent color band rotates to the light path of the first light and turned on when the transparent color band rotates to the light path of the first light, so that the second light beam includes the second light but does not include the first compensation light. Moreover, the second control device is further used for controlling the cyan light C and the blue light B to be simultaneously generated so that the blue light B modulated by the first light modulation device 42 and the cyan light C modulated by the second light modulation device 43 are in the same time sequence. In this regard, a modulation sequence diagram of the first light modulation device 42 and the second light modulation device 43 can be seen in FIG. 7.

In other embodiments of the present disclosure, the aforementioned light source system further includes a third light source for emitting second compensation light. Preferably, the third light source is a laser for emitting red light, where the second compensation light emitted by the third light source may be incident on the fluorescent color band of the first rotating color wheel 1300 or may be incident on the second rotating color wheel 1301. The fluorescent color band or the second rotating color wheel 1301 is configured to transmit the second compensation light, namely, red light R1, and converting red light in a polarized state into red light R1 in a non-polarized state. Additionally, the first light modulation device 42 is further used for simultaneously modulating the red light R and the red light R1 to expand color coordinates of the red light R by the red light R1, increase the proportion of the red light, and expand a color gamut of a synthesized color image.

The third light source may always be in an on state, or in order to save energy, may be in an on state only when the fluorescent color band rotates to the light path of the first light 1. Based on this, the third light source is further connected to the third control device. The third control device controls the third light source to be in the on state when the fluorescent color band rotates to the light path of the first light and in an off state when the transparent color band rotates to the light path of the first light. That is, the third control device controls the third light source to be turned off in the first time sequence and turned on in the second time sequence.

Figure 15:
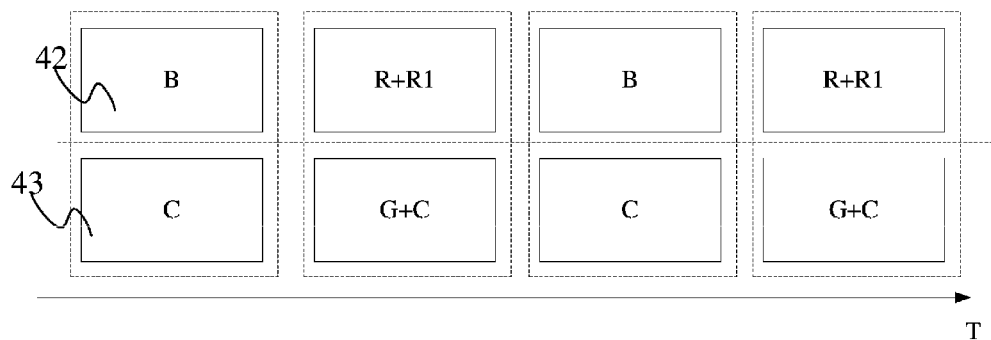
FIG. 15 is another modulation sequence diagram of the first light modulation device and the second light modulation device in Embodiment 2 of the present disclosure.

For circumstances when the second light source 402 is in the on state in both the first time sequence and the second time sequence and the third light source is in the on state only in the second time sequence, a modulation sequence diagram of the first light modulation device 42 and the second light modulation device 43 is shown in FIG. 15. In the first time sequence, the first modulation device 42 modulates the blue light B, and the second light modulation device 43 modulates the cyan light C. In the second time sequence, the first light modulation device 42 simultaneously modulates the red light R and the red light R1, and the second light modulation device 43 simultaneously modulates the green light G and the cyan light C.

By way of the projection system provided in this embodiment, a light source system generates a first light beam in a first time sequence and generates a second light beam in a second time sequence. The first light beam includes a first light and a first compensation light, and the second light beam includes a second light or includes a second light and the first compensation light. A light splitting device sequentially splits the first light beam and the second light beam into light travelling along a first light path and light travelling along a second light path so that the first light, namely, blue light, or green light split from the second light can be compensated by the first compensation light, namely, cyan light, to expand the spectrum range of the first light or the second light and have a wider color gamut of a synthesized color image, thereby meeting REC.709 and DCI color gamut standards.

Moreover, the projection system provided in this embodiment uses two light modulation devices to respectively modulate the light travelling along the first light path and the light travelling along the second light path The projection system in this embodiment thus has higher luminous efficiency and brightness than a system using a single light modulation device and has simpler structure and lower costs than a system using three light modulation devices.

Embodiment 3

Figure 16:
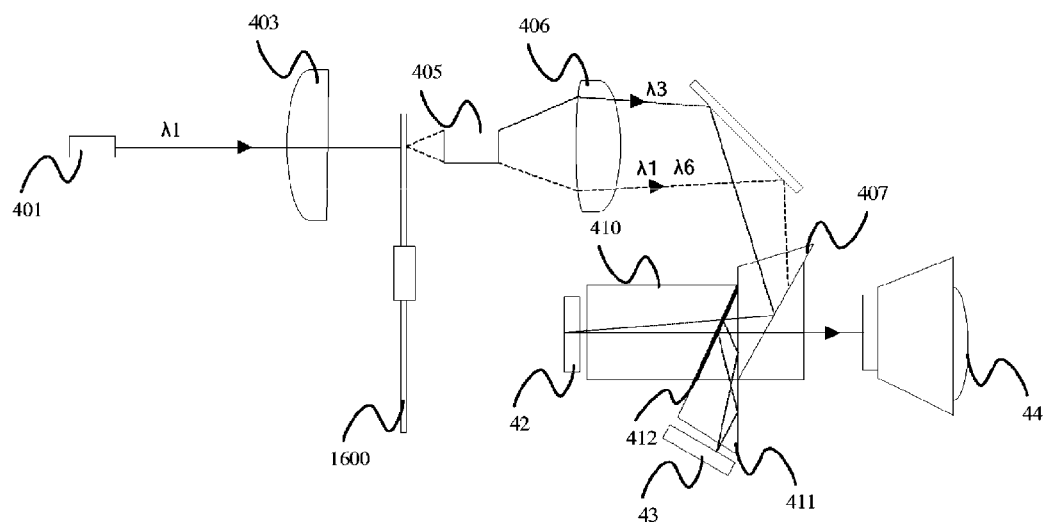
FIG. 16 is a schematic structural view of a projection system provided in Embodiment 3 of the present disclosure.

This embodiment provides a projection system. The projection system provided in this embodiment and the projection system provided in Embodiment 1 have substantially the same structure and both include a light source system, a light splitting device, a first light modulation device, and a second light modulation device. The difference lies in that, as shown in FIG. 16, the light source system in this embodiment includes a first light source 401 and a first rotating color wheel 1600.

The first light source 401 is configured to emit first light 1. Preferably, the first light source 401 is a laser for emitting blue light. The first rotating color wheel 1600 includes a first fluorescent color band and a second fluorescent color band. The first fluorescent color band and the second fluorescent color band sequentially rotate to a light path of the first light $\lambda 1$. The first fluorescent color band is configured to absorb the first light and generate a second light, and the second fluorescent color band is configured to absorb the first light and generate a first compensation light.

The difference from Embodiment 1 and Embodiment 2 further lies in that, in the aforementioned embodiments, the first compensation light, namely, cyan light, is generated by a cyan laser and has a narrow spectrum, while in this embodiment, the first compensation light is generated by fluorescent powder and has a wide spectrum. As compared with the narrow spectrum of laser, light having a spectrum range over 10 nm is defined as a wide-spectrum light.

The first fluorescent color band may be an area having yellow fluorescent powder, for example, the fluorescent color band 4041 in FIG. 4, or the first fluorescent color band may also be an area having red fluorescent powder and green fluorescent powder, for example, the red fluorescent powder color band 40410 and the green fluorescent powder color band 40411 in FIG. 9, and the operating principle thereof is also the same as those in the aforementioned embodiments, and therefore will not be described herein again. In this embodiment, the second fluorescent color band is an area having cyan fluorescent powder or an area having green fluorescent powder, where the green fluorescent powder is cyanic and a dominant wavelength of a generated green light is between 510 nm and 530 nm.

When the second fluorescent color band is an area having cyan fluorescent powder, the first fluorescent color band absorbs the first light $\lambda 1$ and generates the second light, that is, absorbs blue laser and generates yellow light Y, and the second fluorescent color band absorbs the first light $\lambda 1$ and generates first compensation light $\lambda 7$, that is, absorbs blue light and generates cyan light C. While generating the cyan light C, the second fluorescent color band may also transmit the first light $\lambda 1$, namely, the blue light, and convert blue light in a polarized state into blue light B in a non-polarized state. The light splitting device splits the first compensation light into a first part of first compensation light travelling along a first light path and a second part of first compensation light travelling along a second light path in a first time sequence, that is, splits the cyan light C into a first part of cyan light C1 and a second part of cyan light C2 or splits the green light G into a first part of green light G1 and a second part of green light G2. The light splitting device splits the second light into a third light travelling along the first light path and a fourth light travelling along the second light path in a second time sequence, that is, splits the yellow light Y into a red light R and a green light G.

Figure 17:
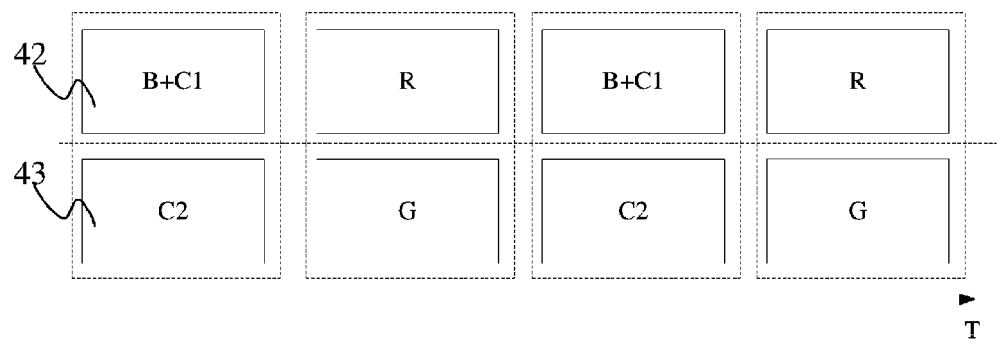
FIG. 17 is a modulation sequence diagram of a first light modulation device and a second light modulation device in Embodiment 3 of the present disclosure.

A modulation sequence diagram of the first light modulation device 42 and the second light modulation device 43 is shown in FIG. 17. The first light modulation device 42 modulates the blue light B and the first part of cyan light C1 in the first time sequence, and the second light modulation device 43 modulates the second part of cyan light C2 in the first time sequence. The first light modulation device 42 modulates the red light R in the second time sequence, and the second light modulation device 43 modulates the green light G in the second time sequence, so that the modulated blue light B, first part of cyan light C1, second part of cyan light C2, red light R, and green light G synthesize a color image.

Figure 18:
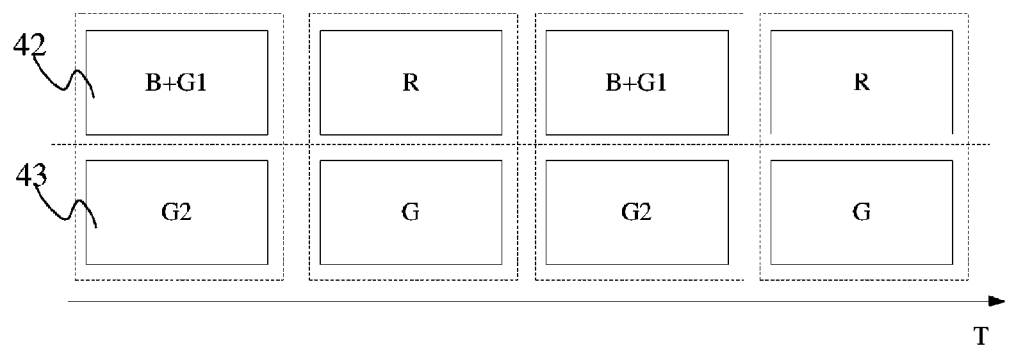
FIG. 18 is another modulation sequence diagram of the first light modulation device and the second light modulation device in Embodiment 3 of the present disclosure.

For circumstances when the second fluorescent color wheel is an area having green fluorescent powder, a modulation sequence diagram of the first light modulation device 42 and the second light modulation device 43 is shown in FIG. 18. Similarly, the first light modulation device 42 modulates the blue light B and the first part of green light G1 in the first time sequence, and the second light modulation device 43 modulates the second part of green light G2 in the first time sequence. The first light modulation device 42 modulates the red light R in the second time sequence, and the second light modulation device 43 modulates the green light G in the second time sequence.

When the second fluorescent color wheel uses cyan fluorescent powder, since the generated light accounts for a large proportion in the cyan light area, cyan light can be directly divided into two parts, namely, a first part of cyan light C1 and a second part of cyan light C2. The first part of cyan light C1 is mixed with blue light to correct the blue light so that the blue light is closer to the DCI color gamut. In this regard, the light splitting film of the light splitting device may be a lowpass coating or may be a bandpass coating.

When the second fluorescent color wheel uses green fluorescent powder, since the spectrum of the generated light reaches the green light area and accounts for a large proportion, a cyanic part, namely, a part having a wavelength no more than 510 nm, needs to be intercepted, that is to say, wide-spectrum green light needs to be divided into two parts, namely, a first part of green light G1 and a second part of green light G2. The intercepted left part of the spectrum, namely, the first part of green light G1, is mixed with blue light to correct the blue light so as to expand a color gamut of a synthesized color image. Meanwhile, the green light can be corrected to a certain extent so that the green light is closer to the DCI color gamut In this regard, the light splitting film of the light splitting device can only be a green light bandpass coating.

Additionally, the light source system in this embodiment further includes a third light source, and the third light source is configured to emit second compensation light. In this embodiment, the second compensation light transmits the first fluorescent color band of the first rotating color wheel 1600. Certainly, the present disclosure is not limited thereto. In other embodiments, the light source system may further include a second rotating color wheel to transmit the second compensation light by the second rotating color wheel, and meanwhile, red light in a polarized state is converted into red light R1 in a non-polarized state. In this regard, the second light modulation device 43 simultaneously modulates the third light and the second compensation light, that is, simultaneously modulates the red light R and the red light R1.

Figure 19:
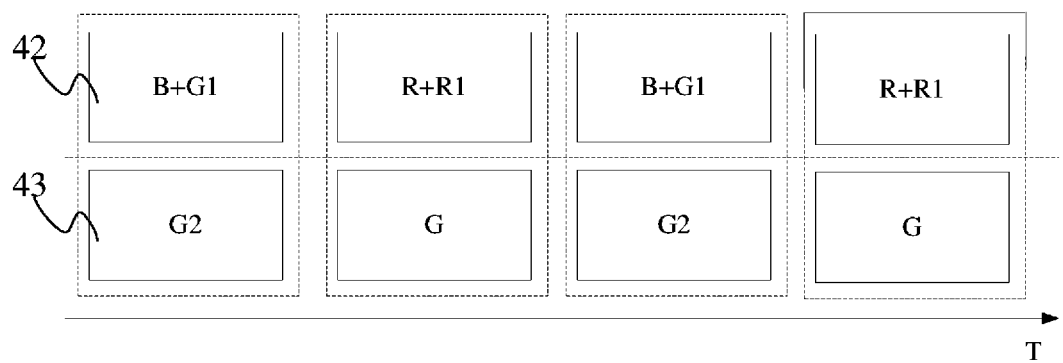
FIG. 19 is still another modulation sequence diagram of the first light modulation device and the second light modulation device in Embodiment 3 of the present disclosure.

Similarly, the third light source 400 may always be in an on state, or in order to save energy, may be in an on state only when the first fluorescent color band rotates to the light path of the first light. When the third light source is in the on state only in the first fluorescent color band, the light source system in this embodiment further includes a third control device connected to the third light source. The third control device is configured to control the third light source to be turned off in the first time sequence and turned on in the second time sequence, that is, turned on when the first fluorescent color band rotates to the light path of the first light and turned off when the second fluorescent color band rotates to the light path of the first light. In this regard, a modulation sequence diagram of the first light modulation device 42 and the second light modulation device 43 is shown in FIG. 19. The first light modulation device 42 simultaneously modulates the blue light B and the first part of green light G1 in the first time sequence, and the second light modulation device 43 modulates the second part of green light G2 in the first time sequence. The first light modulation device 42 simultaneously modulates the red light R and the red light R1 in the second time sequence, and the second light modulation device 43 modulates the green light G in the second time sequence.

By way of the projection system provided in this embodiment, a light source system generates a first light beam in a first time sequence and generates a second light beam in a second time sequence. The first light beam includes a first light and a first compensation light, and the second light beam includes second light. A light splitting device sequentially splits the first light beam and the second light beam into light travelling along a first light path and light travelling along a second light path, so that blue light can be compensated by cyan light or green light or cyan-green light to expand the color gamut of the blue light and have a wider color gamut of a synthesized color image, thereby meeting REC.709 and DCI color gamut standards.

Moreover, the projection system provided in this embodiment uses two light modulation devices to respectively modulate the light travelling along the first light path and the light travelling along the second light path. The projection system in this embodiment thus has higher luminous efficiency and brightness than a system using a single light modulation device and has simpler structure and lower costs than a system using three light modulation devices.

Embodiment 4

This embodiment provides a projection system. The projection system provided in this embodiment and the projection system provided in Embodiment 1 have substantially the same structure and both include a light source system, a light splitting device, a first light modulation device, and a second light modulation device. The difference lies in that the second light source 402 in this embodiment is a light emitting diode for emitting cyan light or green light, and the cyan light or the green light, namely, the first compensation light, emitted by the second light source 402 is a wide-spectrum light. Referring to FIG. 4, when the second light source 402 is a light emitting diode for emitting cyan light, the transparent color band 4042 of the rotating color wheel 404 simultaneously transmits blue light and cyan light. The light splitting device splits the first compensation light into a first part of the first compensation light and a second part of the first compensation light in a first time sequence, that is, splits a cyan light C into a first part of cyan light C1 and a second part of cyan light C2. The light splitting device splits second light into a third light travelling along a first light path and a fourth light travelling along a second light path in a second time sequence, that is, splits yellow light Y into red light R and green light G. A modulation sequence diagram of the first light modulation device 42 and the second light modulation device 43 is shown in FIG. 17. The first light modulation device 42 modulates the blue light B and the first part of cyan light C1 in the first time sequence, and the second light modulation device 43 modulates the second part of cyan light C2 in the first time sequence. The first light modulation device 42 modulates the red light R in the second time sequence, and the second light modulation device 43 modulates the green light G in the second time sequence.

In this regard, since the light generated by the second light source 402 accounts for a large proportion in the cyan light area, cyan light can be directly divided into two parts, namely, a first part of cyan light C1 and a second part of cyan light C2, and the first part of cyan light C1 is mixed with blue light to correct the blue light so that the blue light is closer to the DCI color gamut. In this regard, the light splitting film of the light splitting device may be a lowpass coating or may be a bandpass coating.

When the second light source 402 is a light emitting diode for emitting green light, the transparent color band 4042 of the rotating color wheel 404 simultaneously transmits blue light and green light. The light splitting device splits the green light into a first part of green light G1 and a second part of green light G2 in the first time sequence, and splits yellow light Y into red light R and green light G in the second time sequence. A modulation sequence diagram of the first light modulation device 42 and the second light modulation device 43 is shown in FIG. 18. The first light modulation device 42 modulates the blue light B and the first part of green light G1 in the first time sequence, and the second light modulation device 43 modulates the second part of green light G2 in the first time sequence. The first light modulation device 42 modulates the red light R in the second time sequence, and the second light modulation device 43 modulates the green light G in the second time sequence.

In this regard, since the light generated by the second light source 402 accounts for a large proportion in the green light area, a cyanic part, namely, a part having a wavelength no more than 510 nm, needs to be intercepted, that is to say, wide-spectrum green light needs to be divided into two parts, namely, a first part of green light G1 and a second part of green light G2. The intercepted left part of the spectrum, namely, the first part of green light G1, is mixed with blue light to correct the blue light so as to expand a color gamut of a synthesized color image, and meanwhile, the green light can be corrected to a certain extent by the second part of green light G2 so that the green light is closer to the DCI color gamut. In this regard, the light splitting film of the light splitting device can only be a green light bandpass coating.

By way of the projection system provided in this embodiment, a light source system generates a first light beam in a first time sequence and generates a second light beam in a second time sequence. The first light beam includes a first light and a first compensation light, and the second light beam includes a second light. A light splitting device sequentially splits the first light beam and the second light beam into light travelling along a first light path and light travelling along a second light path, so that a blue light can be compensated by cyan light or green light to expand the color gamut of the blue light and have a wider color gamut of a synthesized color image, thereby meeting REC.709 and DCI color gamut standards.

Moreover, the projection system provided in this embodiment uses two light modulation devices to respectively modulate the light travelling along the first light path and the light travelling along the second light path. The projection system in this embodiment thus has higher luminous efficiency and brightness than a system using a single light modulation device and has simpler structure and lower costs than a system using three light modulation devices.

Various embodiments in the specification are described in a progressive way, each embodiment lays emphasis on the differences from other embodiments, and for the same or similar parts between various embodiments, reference may be made to the description of other embodiments.

With the above description of the disclosed embodiments, those skilled in the art can implement or use the present disclosure. Various modifications to the embodiments are apparent to those skilled in the art. The general principle defined herein can be implemented in other embodiments without departing from the spirit or scope of the present disclosure. Therefore, the present invention should not be limited to the embodiments shown herein, but has the widest scope that is in conformity with the principle and the novel features disclosed herein.

The invention claimed is:

1. A projection system, comprising:
    a light source system for generating a first light beam in a first time sequence and generating a second light beam in a second time sequence, wherein the first light beam comprises a first light and a first compensation light, and the second light beam comprises a second light, or the second light beam comprises a second light and the first compensation light;
    a light splitting device for sequentially splitting the first light beam and the second light beam into light travelling along a first light path and light travelling along a second light path;
    a first light modulation device for modulating the light travelling along the first light path; and
    a second light modulation device for modulating the light travelling along the second light path,
    wherein the first light is a primary light, the second light is a wide-spectrum light comprising at least two kinds of primary light, and a combined light of the first light and the second light comprises light of three primary colors.

2. The projection system according to claim 1, wherein a spectrum range of the first compensation light is between a spectrum range of the first light and a spectrum range of the second light, and the spectrum range of the first compensation light partially overlaps the spectrum range of the second light.

3. The projection system according to claim 1, wherein the light splitting device comprises a first prism and a second prism, and a light splitting film is disposed at an interface between the first prism and the second prism.

4. The projection system according to claim 1, wherein the light source system comprises:
    a first light source for emitting the first light;
    a second light source for emitting the first compensation light; and
    a rotating color wheel, wherein the rotating color wheel comprises at least one fluorescent color band and one transparent color band, and the fluorescent color band is configured to absorb the first light and generate the second light.

5. The projection system according to claim 1, wherein the light source system comprises:
    a first light source for emitting the first light;
    a second light source for emitting the first compensation light;
    a first rotating color wheel disposed on a light path of the first light, wherein the first rotating color wheel comprises at least one fluorescent color band and one transparent color band, and the fluorescent color band is configured to absorb the first light and generate the second light; and
    a second rotating color wheel disposed on a light path of the second light, wherein the second rotating color wheel is a transparent color wheel.

6. The projection system according to claim 1, wherein the light source system comprises:
    a first light source for emitting the first light; and
    a first rotating color wheel, wherein the first rotating color wheel comprises at least a first fluorescent color band and a second fluorescent color band, the first fluorescent color band is configured to absorb the first light and generate the second light, and the second fluorescent color band is configured to absorb the first light and generate the first compensation light.

7. A projection system, comprising:
    a light source system for generating a first light beam in a first time sequence and generating a second light beam in a second time sequence, wherein the light source system comprises a first light source for emitting a first light and a second light source for emitting a first compensation light, wherein the first light beam comprises the first light and the first compensation light, and the second light beam comprises a second light, or the second light beam comprises a second light and the first compensation light;
a light splitting device for sequentially splitting the first light beam and the second light beam into light travelling along a first light path and light travelling along a second light path;
a first light modulation device for modulating the light travelling along the first light path; and
a second light modulation device for modulating the light travelling along the second light path,
wherein the light splitting device comprises a first prism and a second prism, and a light splitting film is disposed at an interface between the first prism and the second prism.

8. The projection system according to claim 7, wherein the light source system further comprises:
a rotating color wheel, wherein the rotating color wheel comprises at least one fluorescent color band and one transparent color band, and the fluorescent color band is configured to absorb the first light and generate the second light.

9. The projection system according to claim 8, wherein the light source system further comprises:
a first control device, wherein the first control device controls the second light source to be turned on in the first time sequence and turned off in the second time sequence so that the second light beam comprises the second light.

10. The projection system according to claim 9, wherein in the first time sequence, the first light and the first compensation light simultaneously transmit through the transparent color band to form the first light beam.

11. The projection system according to claim 7, wherein the light source system further comprises:
a first rotating color wheel disposed on a light path of the first light, wherein the first rotating color wheel comprises at least one fluorescent color band and one transparent color band, and the fluorescent color band is configured to absorb the first light and generate the second light; and
a second rotating color wheel disposed on a light path of the second light, wherein the second rotating color wheel is a transparent color wheel.

12. The projection system according to claim 11, wherein the light source system further comprises a second control device, wherein:
the second control device controls the second light source to be turned on in both the first time sequence and the second time sequence so that the second light beam comprises the second light and the first compensation light; or
the second control device controls the second light source to be turned on in the first time sequence and turned off in the second time sequence so that the second light beam comprises the second light.

13. The projection system according to claim 8, wherein when the first compensation light is a narrow-spectrum light, the first light in the first light beam travels along the first light path, and the first compensation light in the first light beam travels along the second light path; and
when the first compensation light is a wide-spectrum light, the light splitting device splits the first compensation light in the first light beam into a first part of first compensation light and a second part of first compensation light, and the first part of first compensation light and the first light in the first light beam simultaneously travel along the first light path, and the second part of first compensation light travels along the second light path.

14. The projection system according to claim 13, wherein the light splitting device splits the second light in the second light beam into a third light and a fourth light, the third light travels along the first light path, and the fourth light travels along the second light path; and
when the second light beam comprises the first compensation light, the first compensation light and the fourth light simultaneously travel along the second light path.

15. The projection system according to claim 14, wherein the light source system further comprises:
a third light source for emitting a second compensation light, wherein the second compensation light and the third light are light of the same color and different spectra, and the second compensation light and the third light simultaneously travel along the first light path.

16. The projection system according to claim 15, wherein the light source system further comprises:
a third control device, wherein the third control device controls the third light source to be turned off in the first time sequence and turned on in the second time sequence so that the second compensation light and the third light are simultaneously generated.

17. The projection system according to claim 16, wherein:
the first light is blue light, the third light is red light, and the fourth light is green light;
the first compensation light is cyan light or green light or cyan-green light; and
the second compensation light is red light.

18. The projection system according to claim 17, wherein a wavelength range of the first compensation light is 510 nm to 530 nm, and a wavelength range of the second compensation light is 625 nm to 645 nm.

19. A projection system, comprising:
a light source system for generating a first light beam in a first time sequence and generating a second light beam in a second time sequence, wherein the first light beam comprises a first light and a first compensation light, and the second light beam comprises a second light;
a light splitting device for sequentially splitting the first light beam and the second light beam into light travelling along a first light path and light travelling along a second light path, wherein the light splitting device comprises a first prism and a second prism, and a light splitting film is disposed at an interface between the first prism and the second prism,
a first light modulation device for modulating the light travelling along the first light path; and
a second light modulation device for modulating the light travelling along the second light path,
wherein the light source system comprises:
a first light source for emitting the first light; and
a first rotating color wheel, wherein the first rotating color wheel comprises at least a first fluorescent color band and a second fluorescent color band, the first fluorescent color band is configured to absorb the first light and generate the second light, and the second fluorescent color band is configured to absorb the first light and generate the first compensation light, wherein the first compensation light is generated only by the second fluorescent color band.

* * * * *